(12) United States Patent
Li et al.

(10) Patent No.: US 9,281,540 B2
(45) Date of Patent: Mar. 8, 2016

(54) LITHIUM-ION BATTERY COMPRISING AN ION-SELECTIVE CONDUCTING LAYER

(75) Inventors: Xiang Li, Huzhou (CN); Jie Tang, Huzhou (CN); Qingjin Sun, Huzhou (CN); Sheng Xu, Huzhou (CN); Jianhai Luo, Huzhou (CN)

(73) Assignee: MICROVAST POWER SYSTEMS CO., LTD., Huzhou, Zhejiang Province (CN)

( * ) Notice: Subject to any disclaimer, the term of this patent is extended or adjusted under 35 U.S.C. 154(b) by 194 days.

(21) Appl. No.: 13/514,973

(22) PCT Filed: Dec. 6, 2010

(86) PCT No.: PCT/CN2010/001974
§ 371 (c)(1),
(2), (4) Date: Jun. 8, 2012

(87) PCT Pub. No.: WO2011/069331
PCT Pub. Date: Jun. 16, 2011

(65) Prior Publication Data
US 2012/0251891 A1  Oct. 4, 2012

(30) Foreign Application Priority Data
Dec. 9, 2009  (CN) .......................... 2009 1 0155309

(51) Int. Cl.
*H01M 2/14*  (2006.01)
*H01M 2/16*  (2006.01)
(Continued)

(52) U.S. Cl.
CPC .......... *H01M 10/0525* (2013.01); *H01M 2/166* (2013.01); *H01M 4/62* (2013.01); *H01M 4/625* (2013.01); *H01M 4/661* (2013.01); *H01M 2300/0068* (2013.01); *H01M 2300/0091* (2013.01); *Y02E 60/122* (2013.01)

(58) Field of Classification Search
CPC ........... H01M 2/10; H01M 2/14; H01M 2/16; H01M 2/1686; H01M 10/02; H01M 10/04
USPC .......... 429/137, 324, 309, 246, 303; 252/62.2
See application file for complete search history.

(56) References Cited

U.S. PATENT DOCUMENTS

2002/0034688 A1* 3/2002 Chu et al. ....................... 429/232
2003/0118895 A1* 6/2003 Oh et al. ......................... 429/142
(Continued)

FOREIGN PATENT DOCUMENTS

CN  1490891 A  4/2004
CN  1532982 A  9/2004
(Continued)

*Primary Examiner* — Kenneth Douyette
(74) *Attorney, Agent, or Firm* — Cheng-Ju Chiang

(57) ABSTRACT

A lithium-ion battery comprises a positive electrode, a negative electrode, an electrolyte system and an ion-selective conducting layer disposed between the positive electrode and the negative electrode. The ion-selective conducting layer consists of high polymers and an inorganic lithium salt having lithium-ion conductivity, or consists of the inorganic lithium salt. The inorganic lithium salt includes $Li_mM_nO_x$, wherein the values of the m and n ensure the $Li_mM_nO_x$ an electrically neutral compound, M is selected from at least one of B, P, Si, Se, Zr, W, Ti, Te, Ta, Al and As. The lithium-ion battery has a conduction layer having preference-selective conductivity for the lithium ions and disposed between the positive electrode and the negative electrode. The selective-conduction layer has improved mobility for lithium ions. Metal ions generated from the oxidized metal current collector at the negative electrode due to the over-charging of the battery can be blocked.

21 Claims, 5 Drawing Sheets

(51) Int. Cl.
*H01M 10/02* (2006.01)
*H01M 10/04* (2006.01)
*H01M 10/0525* (2010.01)
*H01M 4/62* (2006.01)
*H01M 4/66* (2006.01)

(56) References Cited

U.S. PATENT DOCUMENTS

2006/0024582 A1* 2/2006 Li et al. .................. 429/232
2006/0078790 A1* 4/2006 Nimon et al. .................. 429/137
2008/0254370 A1* 10/2008 Lee et al. ...................... 429/324

FOREIGN PATENT DOCUMENTS

| | | |
|---|---|---|
| CN | 2922234 Y | 7/2007 |
| CN | 101010827 A | 8/2007 |
| CN | 101159375 A | 4/2008 |
| CN | 101188312 A | 5/2008 |
| CN | 101404406 A | 4/2009 |
| EP | 1258939 A2 | 11/2002 |

* cited by examiner

LITHIUM-ION BATTERY COMPRISING AN ION-SELECTIVE CONDUCTING LAYER

CROSS-REFERENCE TO RELATED APPLICATIONS

The present application claims benefit from an international application designating the People's Republic of China and the United States and is a 35 U.S.C. 371 National Phase conversion thereof, which bears a Serial No. PCT/CN2010/001974 and filed Dec. 6, 2010, and contents of which are incorporated herein for reference. The PCT International Patent Application was published in Chinese.

FIELD OF THE INVENTION

The present invention relates to a lithium-ion battery and similar fields in electrical storage technology, and more particularly to a lithium-ion battery including an ion-selective conducting layer.

BACKGROUND OF THE INVENTION

A lithium-ion battery has many merits, such as high energy density per unit weight and per unit volume, long recycle life, required safety and reliability, quick charge/discharge, and so on. Therefore, in recent years, a lithium-ion battery has become a hot topic in research and development of new energy storage technologies, and been popularly applied to fields of high energy and high power. A common lithium-ion secondary battery consists of a material for a positive electrode, a material for a negative electrode, an electrolyte, a separator and a packaging material for battery shell.

The lithium-ion battery having a solid polymer electrolyte (SPE) is so called as a polymer lithium-ion battery. The polymer lithium-ion battery is made up with a positive current collector, a positive electrode film, a solid polymer electrolyte membrane, a negative electrode film and a negative current collector. The shell packaging material of the polymer lithium-ion battery is an aluminum-plastic composite film, and the edge of the shell is sealed by a hot melt process. A polymer membrane doped with a certain proportion of inorganic salt grains, such as $SiO_2$, $Al_2O_3$, and $LiCF_3SO_3$, is directly used as an electrolyte in the current solid polymer electrolyte membrane. The representative polymer is polyethylene oxide (PEO), and a thickness of this kind of electrolyte is generally more than 100 μm, wherein the lithium-ion of the electrolyte can move in the molecular chain. Meanwhile, when a copper foil is used as the current collector metal, for example, copper ions resulting from oxidation of the copper foil may also pass through the solid polymer electrolyte membrane easily. Once the battery is over-discharging, it is likely to cause oxidation of the copper foil so that a large number of copper ions generated accordingly would smoothly move to the surface of the positive electrode material. Besides, this kind of solid electrolyte polymer membrane has a main drawback of relatively low ionic conductivity, which is about $10^{-5}$ S/cm at room temperature and smaller than that of a liquid electrolytic solution with $LiPF_6$ used as an electrolyte by about two orders of magnitude.

When the lithium-ion battery is used as a power battery, in response to requirements on levels of voltage and capacity, it is common to connect a plurality of single cells in series or in parallel to achieve the requirement on operating voltage and capacity of the electrical facility. When the battery is actually connected to a load, and if the battery management system suffers from deficient management conditions and techniques, some of the single cells might be over-discharging as there exists inherent inconsistency among cells. The over-discharge state would cause the overly de-intercalation of the lithium ions from the negative electrode and oxidation of the negative current collector which is usually made of a metal such as a copper foil. Meanwhile, the metal ions generated from the negative current collector will pass through the separator with physical through pores, which are widely used in lithium-ion batteries, e.g. a separator with physical through pores produced by the Celgard Corporation, the United States, or the UBE Company, Japan, and arrive at the positive electrode. As a result, irreversible battery operation as well as short-circuit between the electrodes might occur. Accordingly, the recycle life and the capacity of the battery would be adversely affected, and meanwhile, a risk in safety would be rendered.

Chinese Patent No. CN2922234 discloses an over-discharge protection circuit able to prevent a power lithium-ion battery from over-discharging, which includes a pair of input and output ports and a battery unit. A discharge control switch is configured to be connected between one of the input and output ports and an electrode of the battery unit. The battery unit consists of multiple lithium-ion rechargeable cells interconnected in series. Furthermore, the protection circuit includes an over-discharge voltage-detecting unit able to compare the voltage of the battery with a set voltage and output a comparison result, and an over-discharge logic control unit able to control the on/off state of the discharge control switch according to the output signals outputted by the over-discharge voltage-detecting unit. When the voltage of any of the cells is below the set discharge limiting voltage, or when the voltage of the battery pack is below the set voltage, the over-discharge protection circuit can automatically open the circuit so as to stop discharging, thereby preventing each of the cells from being damaged by over-charging, and ensuring the battery unit safe discharge.

Chinese Patent No. CN101404406 discloses a protection circuit of a lithium battery. The protection circuit consists of an over-charge control tube, an over-discharge control tube and a protection IC. The battery voltages in the over-charging control tube and the over-discharge control tube are monitored and controlled by the protection IC. The protection IC is a CMOS integrated circuit block, including an over-charge protection circuit, an over-discharge protection circuit and an over-current protection circuit. In the protection IC, a clamping circuit is disposed between the output negative electrode V− and the gate electrode of the MOS transistor coupled to the output negative electrodes V−. When the voltage of the output negative electrode V− changes in a wide range, the clamping circuit bears most of the negative voltage, so as to make the voltage bore by the gate electrode of the MOS transistor be limited to less than −2.5V without affecting the functions of the over-charge protection circuit, the over-discharge protection circuit and the over-current protection circuit.

Chinese Patent No. CN101159375 discloses power supply control and protection circuit and method of a lithium battery. By detecting the voltage of the battery, and controlling the power supply of the battery, this method can prevent the battery from over-discharging. Furthermore, the battery can be turned off by way of software.

In all the aforementioned prior arts, the objective of preventing the lithium-ion battery from over-discharging is achieved by way of external circuit designs without substantially or internally avoiding the damage caused by the excessive discharge of the lithium-ion battery. The high-capacity battery pack or the system of the battery pack often consists of thousands or even tens of thousands of battery cells, so it is difficult to use an external circuit design to protect a single cell. Furthermore, it is hard to guarantee reliability of the circuit, and its management cost is relatively high.

SUMMARY OF THE INVENTION

A technique problem that the present invention wants to solve is that a current technique cannot substantially avoid the damage caused by the over-discharge of the lithium-ion battery from the internal battery.

For the traditional lithium-ion battery, after discharging, the battery is forced to keep on discharging (or named overly discharge) or to be reversely charged. In the aforementioned situations, the metal ions (such as copper ions) of the negative current collector would be liberated onto the positive electrode or the separator. The reason is that the negative electrode is oxidized and loses electrons in discharging, and when the over-discharge phenomenon occurred, the lithium-ion of the negative electrode would migrate completely to the positive electrode according to equation (1). After completely releasing the lithium-ions from the negative electrode, the copper of the negative current collector would be oxidized in a form according to equation (2) and generates the copper ions. The copper ions migrate to the positive electrode and are deposited on the surface of the positive electrode material or the separator.

$$Li_xC_n \rightarrow C_n + xLi^+ + xe^- \quad (1)$$

$$Cu \rightarrow Cu^{2+} + 2e^- \quad (2)$$

Therefore, in order to solve the aforementioned technology problems, the present invention provides a technology of disposing a conduction layer between the positive electrode and the negative electrode, wherein the conduction layer has a preference-selective conductivity for lithium ions. The selective-conduction layer has better lithium-ion mobility and a barrier effect for metal ions resulting from the over-discharge battery leading to the oxidative metal current collector of the negative electrode.

The present invention provides a lithium-ion battery, including a negative electrode, a positive electrode, an electrolyte system and an ion-selective conducting layer disposed between the positive electrode and the negative electrode. The ion-selective conducting layer consists of high polymers and an inorganic lithium salt having lithium-ion conductivity, or only consists of the inorganic lithium salt having the lithium-ion conductivity. The said inorganic lithium salt includes $Li_mM_nO_x$, wherein the values of the m and n ensure the $Li_mM_nO_x$ an electrically neutral compound, and the M is selected from at least one of B, P, Si, Se, Zr, W, Ti, Te, Ta, Al and As.

In an embodiment of the present invention, the electrolyte system is an organic electrolyte system; wherein an electrolyte of the organic electrolyte system is at least one selected from the group of $LiPF_6$, $LiAsF_6$, $LiClO_4$ and $LiBF_4$, and a solvent of the organic electrolyte system is at least one selected from the group of EC, PC, EPC, BC, DME, DMC, EMC, DEC and DMF.

In an embodiment of the present invention, the active material of the positive electrode includes at least one of the group commonly used or having been the commercialization of $LiCoO_2$, $LiNiO_2$, $LiMn_2O_4$, $LiFePO_4$ and other complex oxides.

In an embodiment of the present invention, the negative electrode includes an electric current collector consisting of any one of the metals of copper, nickel, aluminum and stainless steel alloy.

In an embodiment of the present invention, the active material of the negative electrode includes any kind of all existing commercial of negative electrode materials, such as carbonaceous materials or materials containing the lithium titanate.

In an embodiment of the present invention, an area of the ion-selective conducting layer is not less than that of the negative electrode, so as to make the ion-selective conducting layer separate the anode from the cathode and completely prevent the transmission of electrons between the anode and the cathode inside the battery.

A separator (such as a porous film produced by the Celgard Corporation of the United States or the UBE Company of the Japan), commonly used in existing commercial of lithium-ion batteries, is mostly a porous membrane including pores, wherein the lithium ions can directly pass through the two sides of the membrane. While in the present invention, the ion-selective conducting layer of the lithium-ion battery is dense, and the lithium ions cannot directly pass through the conduction layer. In an embodiment of the present invention, the function of the ion-selective conducting layer is to make the inorganic lithium salt having the lithium-ion conductivity carry out exchanging for the lithium ions, so as to achieve the lithium-ion conduction and prevent effectively other metal ions generated by the oxidative current collector from passing through the ion-selective conducting layer.

In an embodiment of the present invention, the inorganic lithium salt having the lithium-ion conductivity includes at least one of the compounds $Li_2B_4O_7$, $LiBO_2$, $Li_4SiO_4$, $Li_2SeO_4$, $Li_2ZrO_3$, $Li_2WO_4$, $Li_2TiO_3$, $Li_2TeO_3$, $Li_2TaO_3$, $LiAlO_2$, $Li_3AsO_4$ and $\alpha$-$LiAlSi_2O_6$, or a mixture of any two or more of the above.

In an embodiment of the present invention, the preferred inorganic lithium salt includes at least one of the compounds $Li_2B_4O_7$, $Li_2ZrO_3$, $Li_2TiO_3$, $Li_4SiO_4$, $LiAlO_2$, $LiBO_2$ and $\alpha$-$LiAlSi_2O_6$.

In an embodiment of the present invention, the element M of the inorganic lithium salt $Li_mM_nO_x$ includes an element P, wherein the element M can further include at least one element of B, Si, C, Al, Ti and Zr.

In an embodiment of the present invention, the inorganic lithium salt is $Li_3PO_4$.

In an embodiment of the present invention, the ion-selective conducting layer is a dense membrane consisted of the high polymer and the inorganic lithium salt having the lithium-ion conduction property, wherein there is no pore penetrating the dense membrane. In an embodiment of the present invention, the inorganic lithium salt is uniformly dispersed in the high polymer; wherein the high polymer includes at least one of PAN, PMMA, PVDF, PVC, PVDF-HFP, PVDF-CTFE, PS and PES, and the preferred high polymer is a copolymer or homopolymer of PVDF. Moreover, the copolymer of PVDF includes PVDF-HFP, and the homopolymer of PVDF consists of PVDF. The dense membrane can be attached to at least one side of the porous membrane inside the existing battery. Besides, the dense membrane can be used independently, such as being used as a separator of the battery or to be attached to the surface of the positive electrode and/or the negative electrode of the battery.

In an embodiment of the present invention, the ion-selective conducting layer is a thin film consisted of the inorganic lithium salt covering at least one surface of the positive electrode or the negative electrode of the battery.

When overly discharging or be reversely charged in an abnormal mode, the lithium-ion battery of the present invention has abilities to prevent the battery from internal short circuit and increase the recycle life of the battery. The lithium-ion battery of the present invention includes the ion-selective conducting layer having a better function of the lithium-ion conduction and a barrier effect for metal ions resulting from the oxidative metal current collector of the negative electrode. At the same time, the ion-selective conducting layer, disposed between the negative electrode and the electrolyte, such as covering the surface of the negative electrode material, can effectively prevent the lithium-ion battery from generating the lithium "dendrites" phenomenon when over-charging or being charged, and thereby prevent the lithium-ion battery from internal short circuit.

DETAILED DESCRIPTION OF PREFERRED EMBODIMENTS

Embodiments of the present invention will be described in detail hereinafter with reference to the accompanying drawings.

Figure 1:
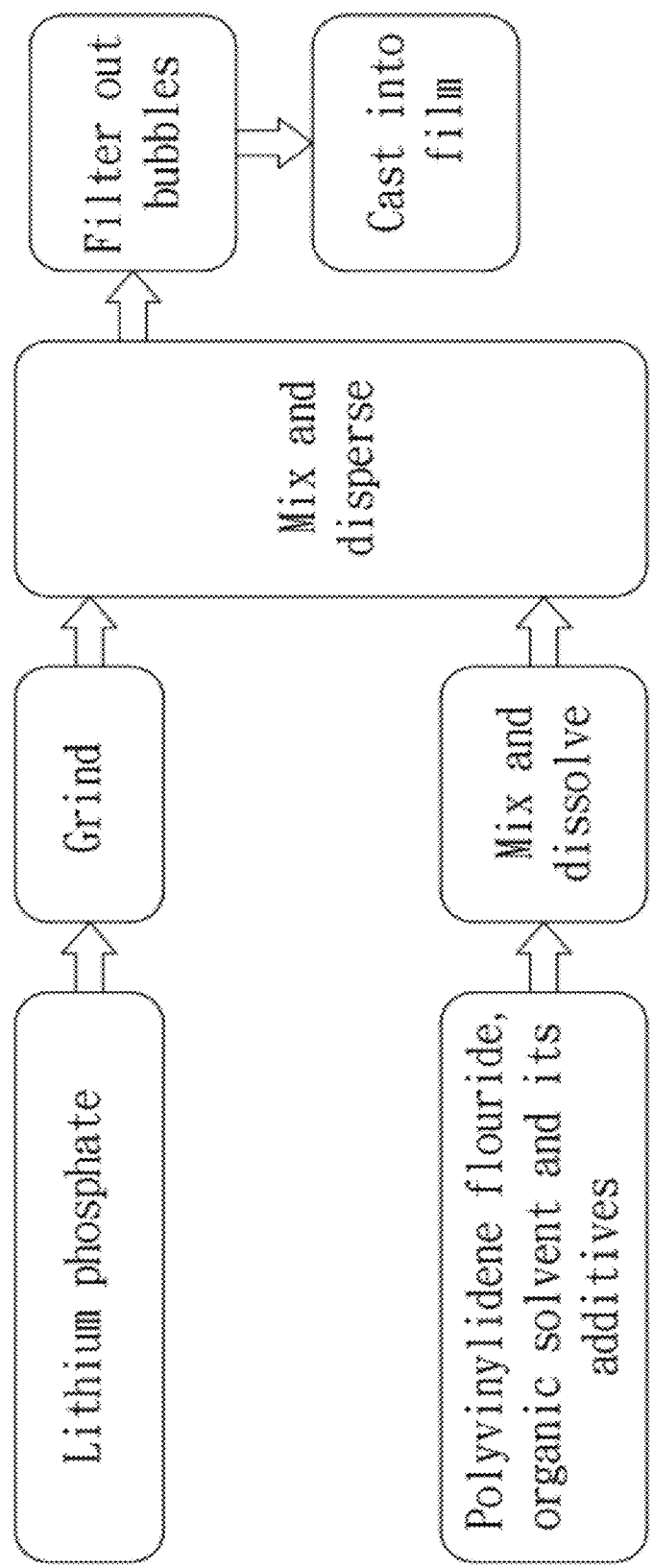
FIG. 1 is a schematic flowchart illustrating a method for manufacturing an ion-selective conducting membrane containing $Li_3PO_4$.

A method for manufacturing an ion-selective conducting membrane containing $Li_3PO_4$, as shown in FIG. 1, includes the following steps:
A. Crush $Li_3PO_4$ particles to a particle size $D_{50}$=0.05~50 μm by a method including ball milling, sand milling, air jet milling or ultra-fine milling;
B. Disperse 5~25 wt % polyvinylidene fluoride (PVDF) and 5~25 wt % crushed lithium phosphate into 55~90 wt % organic solvent by a method including ball milling, sand milling, stirring or high-speed stirring;
C. Filter off and remove materials insufficiently dispersed and bubbles;
D. Transfer the slurry through the casting machine to be casted into a film with thickness of 5~50 μm in a dry state;
E. Cut the film into required sizes of products.

Since the preparation method of the film adopts a matured casting process, the film is rendered rough on one surface thereof and smooth and dense on the opposite surface thereof. The rough surface of the film has good wettability with the electrolyte, so as to effectively reduce resistance of the membrane.

Embodiment 1

Preparation of Ion-Selective Conducting Membrane Containing $Li_3PO_4$

Figure 2:
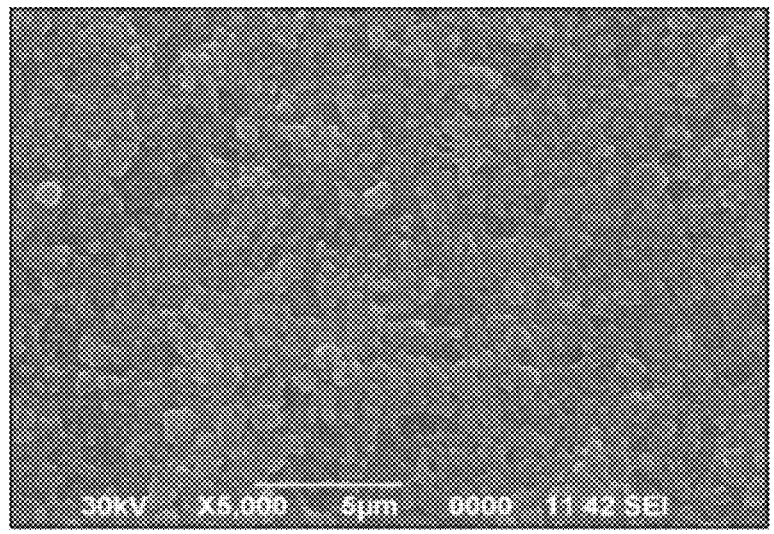
FIG. 2 is a SEM picture showing a surface of a porous structure of the ion-selective conducting membrane containing $Li_3PO_4$ and prepared in accordance with Embodiment 1 of the present invention.
Figure 3:
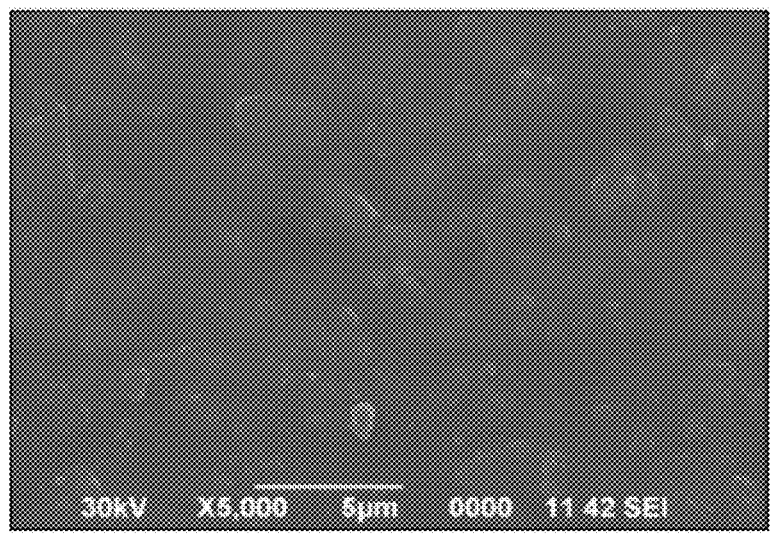
FIG. 3 is a SEM picture showing a dense surface of the ion-selective conducting membrane containing $Li_3PO_4$ and prepared in accordance with Embodiment 1 of the present invention.
Figure 4:
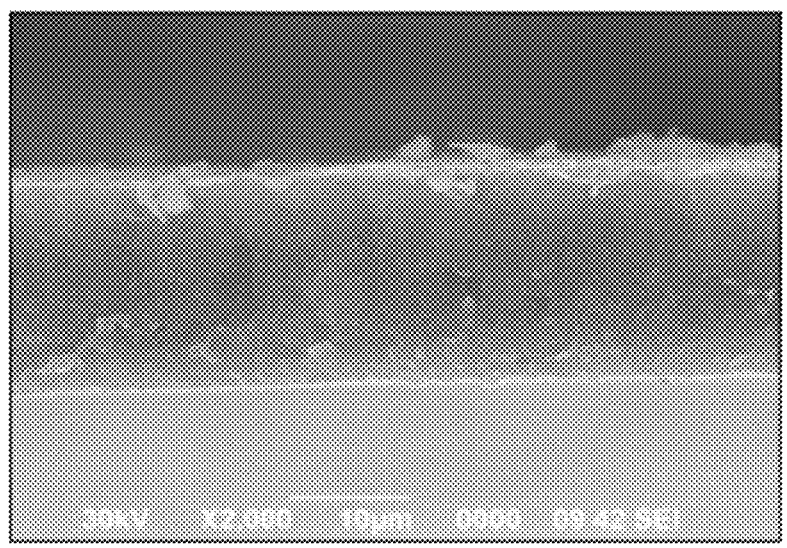
FIG. 4 is a SEM picture showing a cross section of the ion-selective conducting membrane containing $Li_3PO_4$ and prepared in accordance with Embodiment 1 of the present invention.

Grind lithium phosphate powders to a particle size $D_{50}$=4 μm by way of ball milling. Dissolve 52.4 g polyvinylidene fluoride-hexafluoropropylene (PVDF-HFP) in a solvent of 149.2 g acetone and 200 g 1-methyl-2-pyrrolidone (NMP). Stir the solution until polyvinylidene fluoride is completely dissolved. Then add 78.6 g lithium phosphate powders into the solution, and further grind and disperse the resulting solution until the slurry is well mixed. Filter the slurry to remove bubbles, and transfer the slurry to a film casting machine to be casted into a film on a smooth surface of the base membrane. After being dried, the film becomes a dense film having thickness of 20 μm. The surface of the dense film in contact with the base membrane is smoother and denser than the opposite rough surface. Carry out a morphology analysis for the surface of the membrane by way of the scanning electron microscopy (SEM), as shown in FIG. 2. It can be seen from the figure that the surface has a rough configuration. As shown in FIG. 3, the surface in contact with the base membrane is smoother and denser. FIG. 4 shows a cross-sectional configuration of the $Li_3PO_4$ ion-selective conducting membrane.

Permeability Test:

The test is performed by a permeability tester, in which the film is clamped between two standard gaskets with 1.0 square feet hole. The holes at the centers of the standard gaskets allow gas to flow therethrough and under a stable pressure, the required time for gas with a specific volume (100 cc) to flow through a sample with a specific area is measured. The ion-selective conducting membrane containing $Li_3PO_4$, which is prepared as above, is performed with the test, and the test result shows that 100 cc gas still cannot flow through the ion-selective conducting membrane 30 minutes later. The same test is carried out for the commercialized membrane Celgard 2320, and the test result shows that 100 cc gas can entirely flow through the commercialized membrane in 35~450 seconds.

Embodiment 2

Ionic Conductivity Tests

Figure 8:
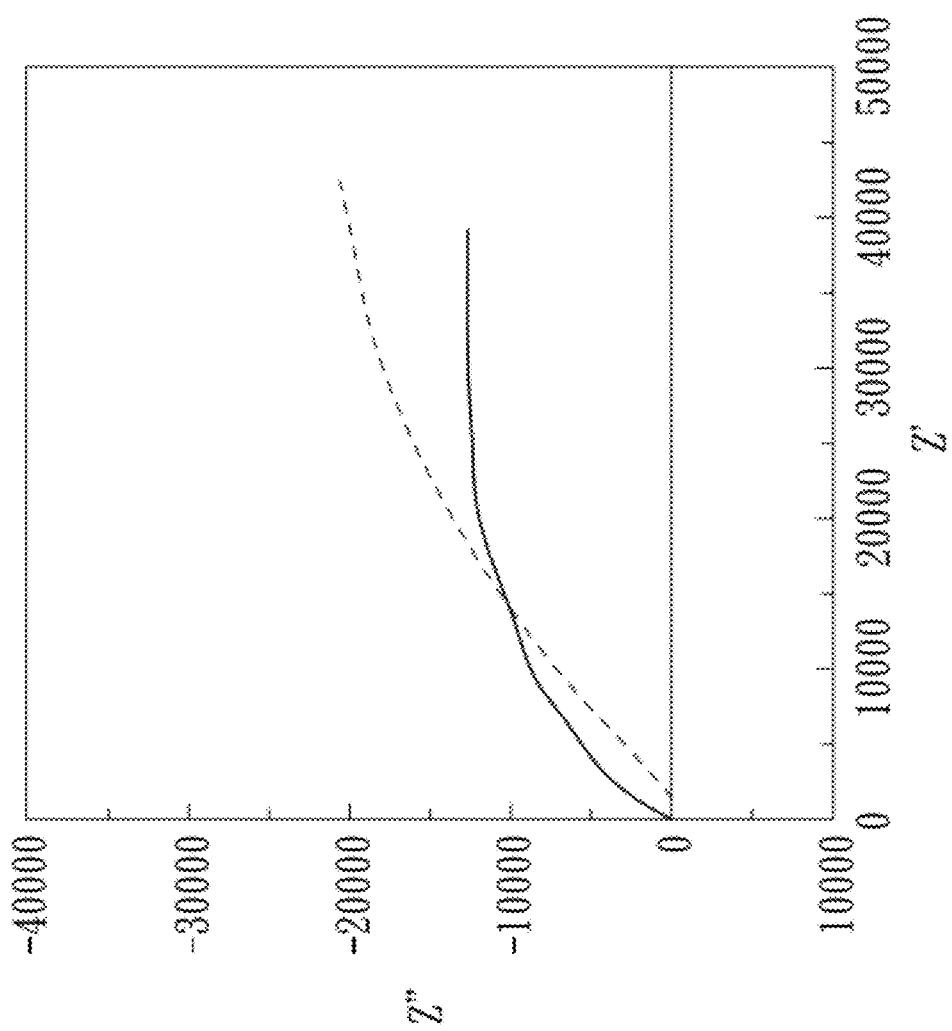
FIG. 8 is a plot showing the electrochemical impedance spectroscopy (EIS) data of different separators in accordance with Embodiment 2 of the present invention.

Immerse the ion-selective conducting membrane containing $Li_3PO_4$ as prepared in Embodiment 1 and the membrane Celgard 2320 (both 20 μm in thickness) fully in the electrolyte solution ($LiPF_6$/EC-DEC, EC to DEC volume ratio 1:1). Clamp the membrane between two blocking electrodes formed of stainless steel sheets in a glove box at argon atmosphere. At room temperature, carry out an EIS test in an electrochemical workstation. The resulting date are shown in FIG. 8, in which the solid line represents the variation curve of the EIS of the ion-selective conducting membrane containing $Li_3PO_4$, and the dotted line represents the variation curve of the EIS of the membrane Celgard 2320. It can be seen from FIG. 8 that the pure resistance of the dense membrane prepared in Embodiment 1 is smaller than that of the membrane Celgard 2320, and the conductivity of lithium ions of the dense membrane is higher than that of the membrane Celgard 2320.

Embodiment 3

Preparation of Lithium-Ion Battery Including the $Li_3PO_4$ Ion-Selective Conducting Membrane For preparing the positive electrode, the active material lithium iron phosphate (including 87 wt % $LiFePO_4$, 5 wt % conductive carbon black, 8 wt % polyvinylidene fluoride ethylene (PVDF) adhesive) is well dispersed in the N-methyl-2-pyrrolidone (NMP) solution according to a specified ratio to obtain mixed slurry of the positive electrode. Then, coat the mixed slurry on an aluminum foil serving as the positive current collector, and dry and roll it to obtain the positive electrode.

For preparing the negative electrode, the active material, including 92 wt % charcoal powder, 2 wt % conductive carbon black, 6 wt % polyvinylidene fluoride ethylene (PVDF) adhesive, is well dispersed in the N-methyl-2-pyrrolidone (NMP) solution according to a specified ration to obtain mixed slurry of the negative electrode. Then, coat the mixed slurry on copper foils of the negative current collector, and dry and roll it to obtain the negative electrode.

For manufacturing the battery, the dense membrane as prepared in Embodiment 1 is used as the membrane, to be laminated with the positive electrode and the negative electrode to form a standard button-cell battery. In the meantime, infuse the electrolyte solution (1 mol/L $LiPF_6$ solution in 1:1 ethylene carbonate (EC)/ethyl methyl carbonate (EMC)) into the standard button-cell battery, so as to form a secondary lithium-ion test battery.

Embodiment 4

Test for Simulation Discharging of a Single Cell in Response to a Reversal Working Condition Caused by Inconsistent Capacities of the Single Cells Interconnected in the Series to Form the Battery Pack A comparison test for the lithium-ion battery as prepared in Embodiment 3 and that made with the membrane of Celgard 2320 is carried out.

Figure 5:
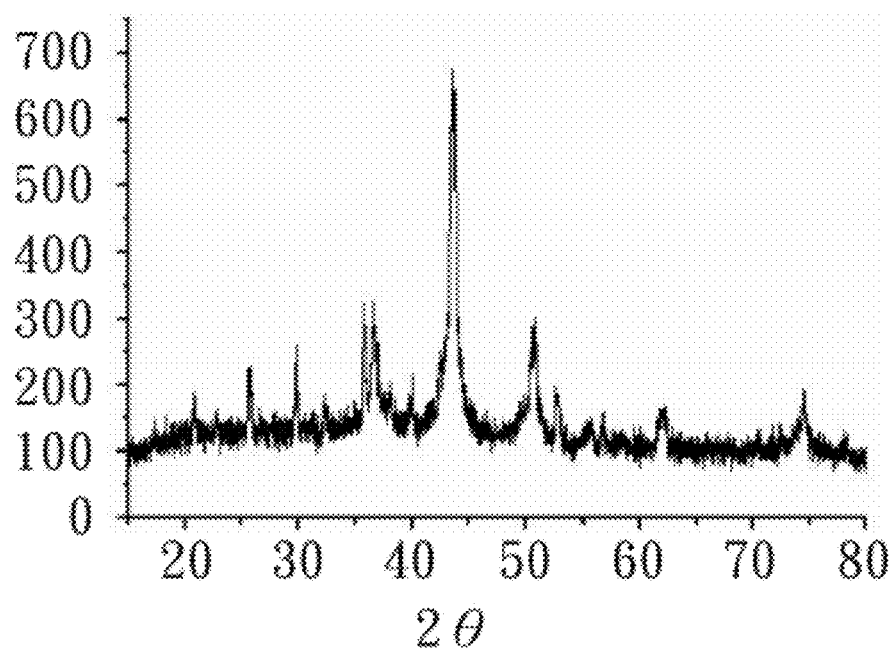
FIG. 5 is an XRD spectrum of a surface of the positive electrode material detached from a battery formed with a Celgard 2320 separator in accordance with Embodiment 4 of the present invention.
Figure 6:
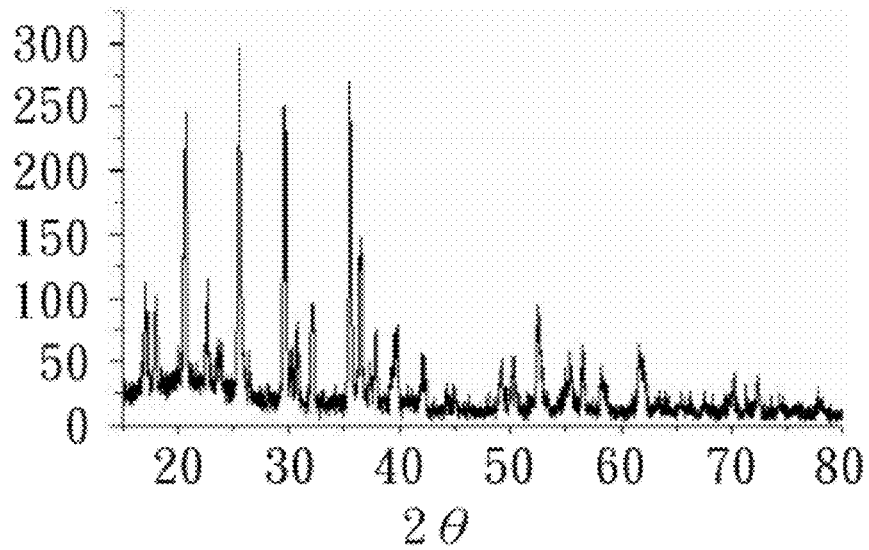
FIG. 6 is an XRD spectrum of a surface of the positive electrode material detached from a lithium-ion battery prepared in accordance with Embodiment 3 of the present invention.
Figure 7:
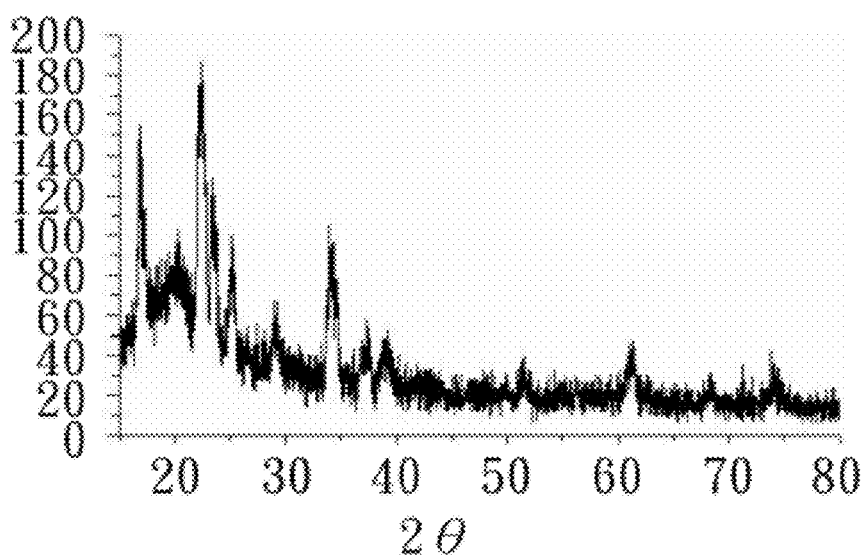
FIG. 7 is an XRD spectrum of the membrane surface of a lithium-ion battery prepared in accordance with Embodiment 3 of the present invention.

Reversely charge two sets of batteries made with different membranes by connecting the positive pole of the test workstation to the negative electrode of the battery while connecting the negative pole of the test workstation to the positive electrode of the battery. It was found that, after the reverse charge is performed, a large amount of copper metal are precipitated on the positive electrode material of the lithium-ion battery made with the membrane Celgard 2320. The battery is thus subject to short-circuit and unable to work normally. Dismantle the two sets of batteries having been reversely charged respectively. Test the surface of the positive electrode material of the battery, which is made with the membrane Celgard 2320, by way of XRD analysis. The XRD spectrum clearly shows XRD characteristic peaks of copper, as shown in FIG. 5. On the contrary, there are no copper ions precipitated on the surface of the positive electrode material of the dismantled battery as prepared in Embodiment 3 in response to the reverse charge. The XRD spectrum of the XRD analysis performed on the surface of the positive electrode material shows no characteristic peaks of copper (see FIG. 6). Likewise, no characteristic peaks of copper are shown in the XRD spectrum (see FIG. 7) in the XRD analysis of the membrane, and the same battery can still continue the charge/discharge recycles after being reversely charged.

Embodiment 5

Test for Simulating Over-Discharging of a Battery

A comparison test for the lithium-ion battery as prepared in Embodiment 3 and that made with the membrane Celgard 2320 is carried out.

Reduce the discharge voltages of two sets of lithium-ion batteries from common 2.5V to 1.0V and 0.1V, respectively, and carry out a battery recycle performance test with a discharge current of 0.5 C. The lithium-ion battery as prepared in Embodiment 3 can still normally work after experiencing thirty over-discharging recycles, while the lithium-ion battery, made with the membrane Celgard 2320, suffers from marked decline in capacity after experiencing ten identical over-discharging recycles, and cannot carry out normal charge and discharge operations.

Embodiment 6

Formation of a Lithium-Ion Battery by Directly Casting a Dense Film on the Surface of the Active Material of the Positive Electrode Grind lithium phosphate powders to a particle size $D_{50}=4$ μm by way of ball milling. Dissolve 52.4 g polyvinylidene fluoride-hexafluoropropylene (PVDF-HFP) in a solvent mixture of 149.2 g acetone and 200 g 1-methyl-2-pyrrolidone (NMP). Stir the solution until polyvinylidene fluoride (PVDF) is completely dissolved. Then add the 78.6 g lithium phosphate powders into the solution. Then grind and disperse the mixture until the uniform slurry is well mixed. Filter the slurry to remove bubbles, and transfer the slurry to a film casting machine to be casted into a film on the surface of the positive electrode of the lithium-ion battery. After being dried, a dense positive electrode having thickness of 20 μm is obtained. After being dried and rolled, the dense positive electrode can be combined with the negative electrode and the electrolyte to form a lithium-ion battery without additional membrane.

Embodiment 7

Formation of a Lithium-Ion Battery by Directly Casting a Dense Film on the Surface of the Active Material of the Negative Electrode In accordance with the same process in Embodiment 6, filter the slurry to remove bubbles, and transfer the slurry to a film casting machine to be casted into a film on the surface of the negative electrode of the lithium-ion battery. After being dried, a dense negative electrode having thickness of 20 μm is obtained. After being dried and rolled, the dense negative electrode can be combined with the positive electrode and the electrolyte to form a lithium-ion battery without additional membrane.

Embodiment 8

Preparation of an Ion-Selective Conducting Membrane Containing $Li_3PO_4$ and a Porous Composite Membrane Grind lithium phosphate powders to a particle size $D_{50}=0.3$ μm and $D_{90}=0.6$ μm by way of ball milling. Dissolve 52.4 g polyvinylidene fluoride-hexafluoropropylene (PVDF-HFP) in a solvent mixture of 149.2 g acetone and 200 g 1-methyl-2-pyrrolidone (NMP). Stir the solution until polyvinylidene fluoride (PVDF) is completely dissolved. Then add the 78.6 g lithium phosphate powders into the solution. Then grind and disperse the mixture until the uniform slurry is well mixed. Filter the slurry to remove bubbles. Strictly control the spacing between a blade and a transport tape, then transfer the slurry to a film casting machine to be casted into a film on the smooth surface of the base membrane. After being dried, the film having thickness of 5 μm is obtained.

Carry out a hot press process to the above film having the thickness of 5 μm and the porous membrane widely used in the existing lithium-ion battery under a press temperature of 120° C. and a pressure of 0.35 kg/cm² to obtain a simply composite membrane of the ion-selective conducting membrane containing $Li_3PO_4$ and the porous membrane.

It is noteworthy that the inorganic lithium salts having the lithium ion conduction property and unable in the ion-selective conducting layer in the aforementioned embodiments are not limited to $Li_3PO_4$, but may be a $Li_3PO_4$ based compound doped with at least one or two of elements B, Si, C, Al, Ti and Zr. Furthermore, the inorganic lithium salts having the lithium ion conducting property may also be at least one of the compounds $Li_2B_4O_7$、$Li_2ZrO_3$、$Li_2WO_4$、$Li_2TiO_3$、$Li_2TeO_3$、$Li_2TaO_3$、$Li_2SeO_4$、$Li_4SiO_4$、$LiAlO_2$、$LiF$、$LiBO_2$、$Li_3AsO_4$ and $\alpha\text{-}LiAlSi_2O_6$ for their features of containing lithium ions as $Li_3PO_4$ does. Furthermore, due to the feature of crystal structure and the presence of crystal defects after doping, the above compounds exhibit capability of lithium ions exchange and conduction.

In the aforementioned embodiments, the high polymer available for use further includes at least one of PAN, PMMA and PVC besides PVDF. Nevertheless, the high polymer PVDF-HFP is preferred as PVDF-HFP has good chemical stability in the electrolyte. Furthermore, since PVDF-HFP has been used as a binder in the electrode of the lithium-ion battery the PVDF polymer material has a good chemical compatibility in the lithium-ion battery.

What is claimed is:
1. A lithium-ion battery, comprising:
a positive electrode;
a negative electrode;
an electrolyte system;
a separator disposed between the positive electrode and the negative electrode, the separator being a porous membrane; and
an ion-selective conducting layer, disposed between the positive electrode and the negative electrode, the ion-selective conducting layer being attached to at least one side of the porous membrane of the separator, wherein the ion-selective conducting layer is consisted of high polymers and an inorganic lithium salt having a lithium-ion conductivity, or is consisted of the inorganic lithium salt having the lithium-ion conductivity, the inorganic lithium salt includes $Li_mM_nO_x$, the values of the m and n ensure the $Li_mM_nO_x$, an electrically neutral compound, the value of x is any positive value, and the M is selected from at least one of B, P, Si, Se, Zr, W, Ti, Te, Ta, Al and As, and the ion-selective conducting layer has a preference-selective conductivity for lithium ions and has a barrier effect for metal ions resulting from over-discharge to the negative electrode, wherein a surface of the ion-selective conducting layer is rendered rough, and an opposite surface thereto is smooth and dense.

2. The lithium-ion battery according to claim 1, wherein the electrolyte system is an organic electrolyte system.

3. The lithium-ion battery according to claim 2, wherein an electrolyte of the organic electrolyte system is at least one selected from the group of $LiPF_6$, $LiAsF_6$, $LiClO_4$ and $LiBF_4$, and a solvent of the organic electrolyte system is selected from at least one of EC, PC, EPC, BC, DME, DMC, EMC, DEC and DMF.

4. The lithium-ion battery according to claim 1, wherein the negative electrode includes an electric current collector consisting of any one of metals of copper, nickel, aluminum and stainless steel alloy.

5. The lithium-ion battery according to claim 1, wherein an active material of the negative electrode includes a carbonaceous material or lithium titanate.

6. The lithium-ion battery according to claim 1, wherein an area of the ion-selective conducting layer is not less than that of the negative electrode.

7. The lithium-ion battery according to claim 1, wherein the dense membrane is not penetrated through by a pore.

8. The lithium-ion battery according to claim 7, wherein the inorganic lithium salt having lithium-ion conductivity is dispersed in the high polymer.

9. The lithium-ion battery according to claim 8, wherein the element M of the $Li_mM_nO_x$ of the inorganic lithium salt includes an element P.

10. The lithium-ion battery according to claim 9, wherein the element M further includes at least one element of B, Si, C, Al, Ti and Zr.

11. The lithium-ion battery according to claim 9, wherein the inorganic lithium salt is $Li_3PO_4$.

12. The lithium-ion battery according to claim 8, wherein the inorganic lithium salt includes at least one of the compounds $Li_2B_4O_7$, $Li_2ZrO_3$, $Li_2TiO_3$, $Li_4SiO_4$, $LiAlO_2$, $LiBO_2$ and $\alpha\text{-}LiAlSi_2O_6$.

13. The lithium-ion battery according to claim 11, wherein the high polymer includes at least one of PAN, PMMA, PVDF, PVC, PVDF-HFP, PVDF-CTFE, PS and PES.

14. The lithium-ion battery according to claim 13, wherein the high polymer includes a copolymer or a homo-polymer of the PVDF.

15. The lithium-ion battery according to claim 14, wherein the copolymer of the PVDF includes PVDF-HFP.

16. The lithium-ion battery according to claim 14, wherein the homo-polymer of the PVDF consists of the PVDF.

17. The lithium-ion battery according to claim 1, wherein the dense membrane is a film covering surfaces of the positive electrode and/or the negative electrode of the battery.

18. The lithium-ion battery according to claim 1, wherein the element M of the $Li_mM_nO_x$ of the inorganic lithium salt includes an element P.

19. The lithium-ion battery according to claim 18, wherein the element M further includes at least one element of B, Si, C, Al, Ti and Zr.

20. The lithium-ion battery according to claim 18, wherein the inorganic lithium salt is $Li_3PO_4$.

21. The lithium-ion battery according to claim 1, wherein the inorganic lithium salt includes at least one of $Li_2B_4O_7$, $Li_2ZrO_3$, $Li_2TiO_3$, $Li_4SiO_4$, $LiAlO_2$, $LiBO_2$ and $\alpha\text{-}LiAlSi_2O_6$.

* * * * *